No. 765,541.  
Patented July 19, 1904.

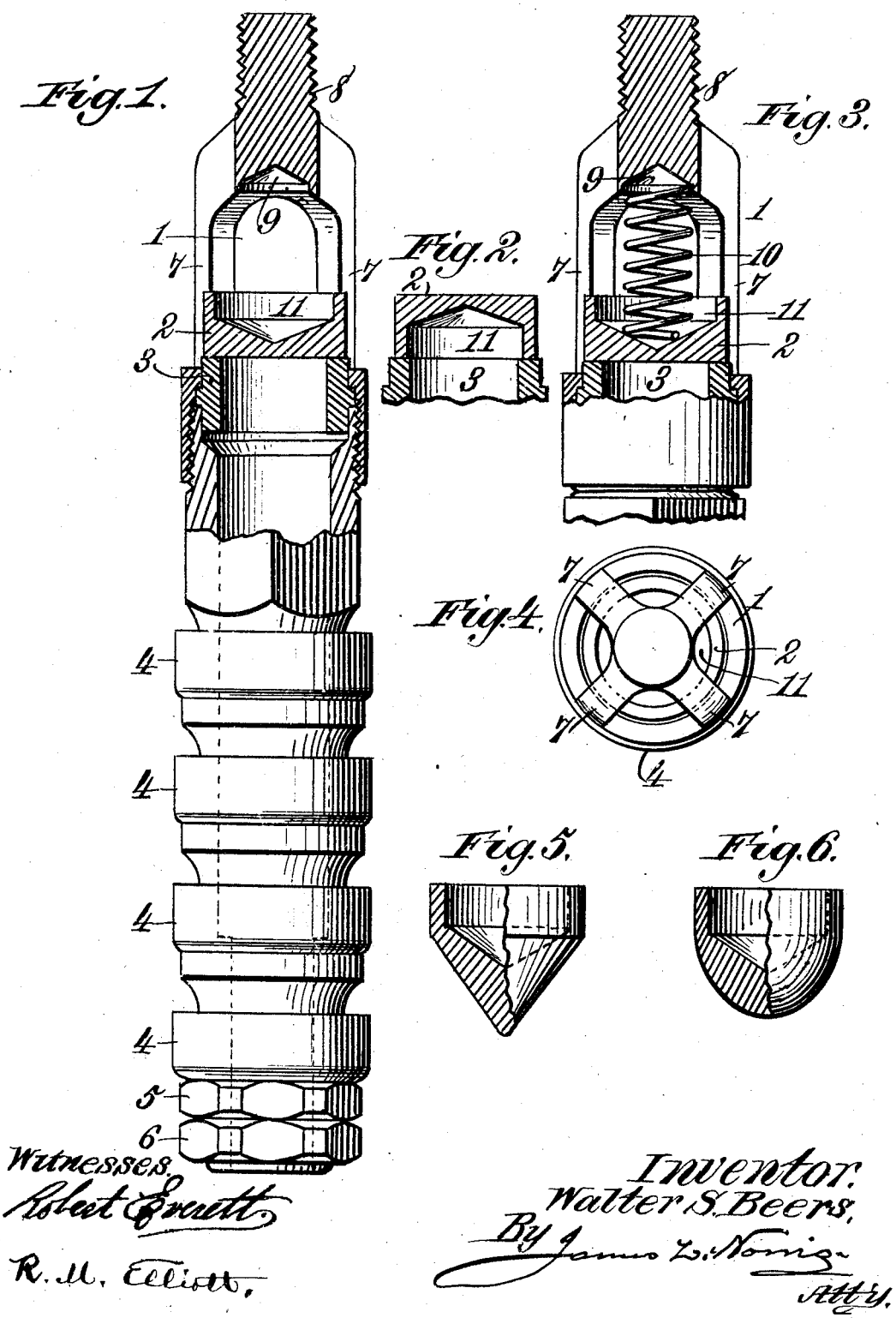

UNITED STATES PATENT OFFICE.

WALTER S. BEERS, OF MARION, INDIANA.

PUMP-PISTON.

SPECIFICATION forming part of Letters Patent No. 765,541, dated July 19, 1904.

Application filed January 13, 1904. Serial No. 188,878. (No model.)

*To all whom it may concern:*

Be it known that I, WALTER S. BEERS, a citizen of the United States, residing at Marion, in the county of Grant and State of Indiana, have invented new and useful Improvements in Pump-Pistons, of which the following is a specification.

This invention relates to pump-pistons for oil or other wells.

The object of the invention is in a ready and practical manner to catch and retain obstructive materials—such as rivets, bolts, sand, or pebbles—which would cause the piston to become inoperative, and also to prevent any gas-pressure within the tubing from rendering the piston inoperative; furthermore, to present a pump-piston provided with a lift-valve which shall combine the properties of a cup or trap for catching or retaining any materials which would tend to render such piston inoperative, and also to permit of such lift-valve being inverted, if found necessary or desirable.

With the above and other objects in view the invention consists in the novel construction and combination of parts of a pump-piston for oil or other wells, as will be hereinafter fully described and claimed.

In the accompanying drawings, forming a part of this specification, and in which like characters of reference indicate corresponding parts, there are illustrated four forms of embodiment of the invention, each capable of carrying the invention into effect, it being understood that the elements therein exhibited may be varied or changed as to shape, proportion, and exact manner of assemblage without departing from the spirit thereof.

In the drawings, Figure 1 is a view in elevation, partly in section, of a pump-piston embodying one form of the invention. Fig. 2 is a detail view in section exhibiting the lift-valve shown in Fig. 1 as inverted, it being understood that each of the different forms of lift-valves herein described are adapted for inversion in accomplishing the results for which the present invention is designed, and for this reason such lift-valves are only shown in one position. Fig. 3 is a view similar to Fig. 1, exhibiting a spring for holding the lift-valve seated against gas-pressure. Fig. 4 is a view in top plan. Figs. 5 and 6 are detail views, partly in section, of two different forms of lift-valves that may be employed in lieu of that shown in Figs. 1 and 3.

Referring to the drawings by reference characters, the piston-barrel is provided at one end with a cage 1 for the lift-valve 2 and is also provided with a valve-seat 3, which is shown as reversible. The piston-barrel has suitably connected thereto the packing-cups 4, which may be of any suitable material, preferably of leather or the like, and which are combined with the piston-barrel in any suitable manner—for example, by means of a nut 5 and a locking-nut 6, these latter being connected to the piston-barrel at the other end thereof, the packing-cups being interposed between that end of the piston-barrel carrying the cage and the end carrying the nuts.

The cage 1 is by preference made of cast iron or steel, although it may be made of any other material, and, as shown in Fig. 4, is provided with four ribs or arms 7, this number being arbitrary and may be changed if required. The upper portion of the cage is provided with a threaded shank or stem 8, and this is by preference integral with the cage, although it may be a separate element assembled with the cage in any preferred manner. The under face or lower terminal of the stem is countersunk or recessed at 9 to receive the upper whirl or turn of a spiral spring 10, which is adapted to hold the lift-valve 2 seated against gas-pressure, the said lift-valve being provided on its upper face with a chamber 11 to receive the lower whirl or coils of the spring. As herein shown, the chambers 9 and 11 of the cage and lift-valve, respectively, are cone-shaped for the purpose of causing the respective terminals of the spring 10 to center themselves, and, as will be obvious, such arrangement will be preferable; but it is to be understood that the invention is not to be limited to this arrangement, as, if preferred, the said seats may be of cylindrical form with flat bearing-surfaces and still be within the scope of the invention.

The lift-valve shown in Figs. 1, 2, and 3 is of cylindrical form, while that shown in Fig. 5 is cylindrical-cone-shaped and that shown in Fig. 6 cylindrical and semihemispherical or ovoid. In each case the lift-valve is provided with a chamber, such as that shown in Figs. 1, 2, and 3, to receive a spring.

As is well known, in some oil-wells the gas-pressure is such that the valve will be held above its seat, thus rendering the pump inoperative; but by the provision of the spring 10, as described, the lift-valve will be normally held against the seat 3, the tension or power-exerting force of the spring being such that, while it will cause the lift-valve to remain seated against gas-pressure, not to interfere with the proper operation of the pump.

In the form of lift-valve shown in Figs. 1 to 3 the same is of true cylindrical form, while that shown in Fig. 5 is a combined cylinder and cone and that shown in Fig. 6 is a combined cylinder and oblate spheroid. The form of lift-valve first mentioned—that is to say, that shown in Figs. 1 to 3—is preferred for the reason that whether occupying the position shown in Figs. 1 and 3 or that shown in Fig. 2 there is always a square seating-surface between the valve-seat 3 and the lift-valve; but the forms of lift-valve shown in Figs. 5 and 6 also possess features of novelty and advantage inasmuch as when positioned as shown in said Figs. 5 and 6 they will automatically seat themselves, and in the event of any inequality or wearing of the valve-seat compensation therefor will be automatically effected.

As stated at the outset of the specification, a salient object is to prevent any extraneous material or substances—such as rivets, bolts, sand, or the like—which may be drawn up by the piston or dropped from above from entering the valve-cage and causing the lift-valve to become inoperative. This is effected by making the channels or grooves 12 between the ribs of such depth that any extraneous substances will be caught by the lift-valve. In other words, the channels between the ribs are cut inward transversely to the surface of the shank 8, and the inner wall of the lift-valve is disposed laterally or circumferentially beyond the outer wall of the shank for this purpose. Thus any extraneous material drawn up by the piston or dropping from above will pass into the chamber 11 of the lift-valve 2 when the same is disposed as shown in Figs. 1 and 3, the spring shown in Fig. 3 being of such size as not to interfere with the catching and retaining of such extraneous material.

Where the lift-valve 2 is inverted, as shown in Fig. 2, the same being true of the lift-valves shown in Figs. 5 and 6 when inverted, any extraneous material will be caught or shed and prevented from entering beneath the lift-valve, and thus interfering with its proper operation.

As herein shown, the shank 8 is integral with the cage and is exteriorly threaded for connection with the sucker-rod, and this form of cage and shank will generally be preferred; but, if preferred, the shank may be a separate element combined with the ribs and may be socketed and interiorly threaded to receive an exteriorly-threaded terminal of the sucker-rod.

Briefly, to sum up the salient features of the present invention, it may be stated generally that the invention resides, first, in the combination with a cage of a lift-valve provided with means for catching and retaining any extraneous material that would tend to render the piston inoperative—such as loose bolts, rivets, or the like; secondly, in the provision of means for holding the lift-valve seated against gas-pressure; thirdly, in the provision of a cage for housing a lift-valve adapted to catch and retain any material that would tend to prevent the lift-valve from operation, the members of the cage being so constructed as to permit any extraneous material to enter and be caught by the valve; fourthly, in a cage housing a lift-valve provided with a cup, the cage being constructed in such manner that obstructive material from above or below will be directed into and caught by the lift-valve.

Having thus described the invention, what I claim is—

1. A pump-piston comprising a cage connected with one end of the piston-barrel and provided with a threaded shank and further provided with a recess, a cup-valve arranged in said cage, said valve of greater diameter than the shank, and means engaging in the recess of the cage and in the valve for retaining the valve seated against undue pressure.

2. In a pump-piston, the combination with the piston-barrel having a valve-seat, a cage connected with one end thereof and a shank suitably connected with the cage, of a valve mounted upon said seat and having a chamber of greater diameter than the shank of the cage, and a spring seated in the cage and the valve for retaining the valve seated against undue pressure.

3. In a pump-piston, a cage mounted at one end of the piston-barrel and having a shank suitably connected therewith, and a valve provided with a chamber arranged within and surrounded by the cage, the diameter of said chamber being greater than the diameter of the shank, said chamber of the valve adapted to catch and retain any extraneous material passing the cage.

4. In a pump-piston, a cage mounted at one end of the piston-barrel and having a shank suitably connected therewith, a valve provided with a chamber arranged within and surrounded by the cage, the diameter of said chamber being greater than the diameter of the shank, said chamber of the valve adapted to catch and retain any extraneous material passing the cage, a valve-seat carried by the piston-barrel, and a spring arranged in the cage, engaging therewith and in the valve for retaining the latter against its seat.

5. In a pump-piston, a cage mounted at one end of the piston-barrel and provided with a shank, and a valve mounted in the cage and provided with a chamber of greater diameter than said shank.

6. In a pump-piston, a cage mounted at one end of the piston-barrel provided with a shank, a valve mounted in the cage and having a chamber of greater diameter than the shank, and means within the cage for limiting the upward movement of the valve.

7. A pump-piston comprising a cage at one end thereof, said cage provided with a seat and a shank, a valve mounted in the cage and provided with a chamber of greater diameter than the shank, and a spring having its terminals housed in the chamber of the valve and the seat of the cage.

8. The pump-piston comprising a cage connected to one end thereof and provided with a seat and a shank, a valve mounted in the cage and having a chamber of greater diameter than the shank, the bottom of said chamber depressed to form a seat, and a spring having its terminals housed in the seat of the valve and the seat of the cage.

In testimony whereof I have hereunto set my hand in presence of two subscribing witnesses.

WALTER S. BEERS.

Witnesses:
    DON CAMERON,
    JESSE E. HUFFMAN.